(12) United States Patent
Choi

(10) Patent No.: US 7,322,037 B2
(45) Date of Patent: Jan. 22, 2008

(54) STRUCTURE OF OPTICAL DISC CARTRIDGE

(75) Inventor: Bi Seok Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 10/909,371

(22) Filed: Aug. 3, 2004

(65) Prior Publication Data

US 2005/0010936 A1 Jan. 13, 2005

Related U.S. Application Data

(63) Continuation of application No. 09/405,171, filed on Sep. 24, 1999, now Pat. No. 6,785,900.

(30) Foreign Application Priority Data

Jan. 23, 1999 (KR) ................... 1999-2132

(51) Int. Cl.
*G11B 23/03* (2006.01)
(52) U.S. Cl. .................................... 720/733
(58) Field of Classification Search ............... None
See application file for complete search history.

(56) References Cited

U.S. PATENT DOCUMENTS

| 4,839,760 A | 6/1989 | Yamada et al. |
| 4,849,958 A | 7/1989 | Douwes et al. |
| 4,928,271 A | 5/1990 | Verhagen |
| 5,121,278 A | 6/1992 | Tanaka et al. |
| 5,175,726 A * | 12/1992 | Imokawa .................... 720/728 |
| 5,282,106 A * | 1/1994 | Saito et al. .................. 360/133 |
| 5,812,351 A | 9/1998 | Wulfing et al. |
| 5,850,327 A * | 12/1998 | Mizuta ....................... 360/133 |
| 6,021,028 A | 2/2000 | Uwabo et al. |
| 6,111,727 A | 8/2000 | Uwabo et al. |
| 6,172,962 B1 | 1/2001 | Goto et al. |

FOREIGN PATENT DOCUMENTS

| JP | 10144031 A | 5/1998 |
| JP | 11-213596 | 8/1999 |
| JP | 11-238337 | 8/1999 |
| JP | 2000-40329 | 2/2000 |
| JP | 2000-182348 | 6/2000 |
| JP | 2000215632 A | 8/2000 |

* cited by examiner

*Primary Examiner*—Tianjie Chen
(74) *Attorney, Agent, or Firm*—Birch, Stewart, Kolasch & Birch, LLP

(57) ABSTRACT

A disc cartridge can prevent a disc from being damaged, and smoothly enable a disc rotation, by forming a protruding supporting member to have a predetermined height from an inner surface of a casing receiving the disc, and by preventing the disc from interfering with an outer surface of the casing or other components. The structure of the disc cartridge includes the casing receiving the disc, and a disc holder disposed separably at the casing, having tension arms elastically holding the disc, and guiding the disc into or out of the casing, the protruding supporting member having a predetermined height from the inner surface of the casing and being contacted with a non-recording region of the disc, which height is equal to or greater than a sum of a vertical deflection of the disc due to gravity, a vertical deflection of the tension arms, and an air gap which must be maintained between surfaces of the disc and flanges of the tension arms.

8 Claims, 4 Drawing Sheets

STRUCTURE OF OPTICAL DISC CARTRIDGE

This application is a Continuation of application Ser. No. 09/405,171, now U.S. Pat. No. 6,785,900, filed on Sep. 24, 1999, and for which priority is claimed under 35 U.S.C. § 120; and this application claims priority of Application No. 2132/1999 filed in Korea on Jan. 23, 1999 under 35 U.S.C. § 119; the entire contents of all are hereby incorporated by reference.

BACKGROUND OF THE INVENTION

1. Field of the Invention

The present invention relates to an optical disc cartridge receiving an optical disc, and in particular to a structure of a disc cartridge from which a disc can be smoothly taken out and which prevents the disc from being damaged, by setting the height of a rib which is positioned at an inner surface of the disc cartridge where a disc holder guiding insertion and removal of the disc is disposed, and which is contacted with a non-recording region of the disc.

2. Description of the Background Art

In general, optical discs are divided into reproducible(that is, read-only) discs such as a CD-ROM and a DVD-ROM, and writable discs such as a write once read many WORM type, a rewritable type and a RAM type, in accordance with the number of time the disc can be written to.

As the writable disc is of high density, its information recording side may be easily contaminated with dust or fingerprints, or scratched.

Accordingly, the writable disc is generally received in a cartridge in order not to be contaminated or damaged.

A conventional disc cartridge will now be described with reference to FIGS. 1 and 2.

FIG. 1 is a plan view illustrating a general disc cartridge, and FIG. 2 is a cross-sectional view taken along line II-II' in FIG. 1.

As shown in FIGS. 1 and 2, in the general disc cartridge at upper and lower inner surfaces of a casing 12 receiving a disc 11, ribs 13 are formed facing each other.

The ribs 13 contact with a non-writable clamping region at an inner circumferential portion of the disc 11, and keep the writable portion of the disc 11 separated from the inner surface of the casing 12 by a predetermined spacing, thereby preventing the recording side of the disc 11 from being damaged due to contact with the inner surface of the casing 12.

Pursuant to the standard for the digital video disc (DVD), the height of the ribs 13 in the disc cartridge 10 is not set. However, the height of the ribs 13 is defined when a thickness T between an outer surface of the casing 12 and an inner surface thereof and a height H between the outer surface of the casing 12 and the rib 13 is set.

Here, the thickness T has a maximum value of 2.2 mm, and the height H has a maximum value of 2.5 mm. Accordingly, the manufacturing companies can freely set the height of the rib 13 so long as the conditions of T and H are satisfied.

It is possible to remove the ribs 13 where the disc 11 is mounted in a drive. However, as described above, the recording side of the disc 11 may be damaged due to contact with the inner surface of the casing 12, and thus the ribs 13 having a predetermined height need to be formed in the casing 12.

On the other hand, there has been suggested a disc cartridge from which the disc can be taken out when the user so desires. In general, when the disc is taken out, the recording side of the disc may be damaged due to carelessness of the user, or contaminated with fingerprints. Accordingly, there is provided a disc cartridge including a disc holder for opening/closing a disc receiving groove in the casing.

For example, a disc cartridge disclosed in Korean Patent Application No. 98-28766 applied for registration by the applicant concerned and also filed in U.S. as application Ser. No. 09-347388 on Jul. 6, 1999 will now be explained with reference to FIG. 3.

FIG. 3 is an exploded plan view illustrating a disc cartridge having a tension-arm disc holder.

As shown therein, a disc holder 30 is provided with tension arms 31, 31' formed in a single body (hereinafter, referred to as 'tension arm-disc holder').

In case the disc 11 is received in a casing 20 or taken out from the casing 20, although the user does not directly touch the disc 11, the tension arm disc holder 30 holds the disc 11 by an elastic force of the tension arms 31, 31'.

When the disc 11 is guided into the disc cartridge, the tension arms 31, 31' of the tension arm disc holder 30 contact with guide ribs 21, 21' formed at a rear portion of the casing 20, whereby the tension arms 31, 31' are spread apart and thereby the disc 11 is released from the tension arms 31, 31'.

The tension arm disc holder 30 holds an outer circumferential surface of the disc 11 by the elastic force, thus minimizing contamination by fingerprints or the likes.

However, in the earlier proposed disc cartridge employing a tension arm disc holder, the height of the rib protruded in the disc cartridge is not specifically regulated, and thus the disc 11 and the tension arms 31, 31' may interfere with each other in the disc cartridge where the tension arm disc holder 30 is disposed.

FIG. 4 is a cross-sectional view illustrating a disc cartridge provided with the tension arm disc holder 30 for showing the interference between the disc 11 and the tension arms 31, 31'. The tension arm 31, 31' are contacted with the guide ribs 21, 21', thereby being separated from the disc 11.

Normally, the disc 11 is positioned in order for its outer circumferential surface to face a receiving groove 40 formed between flanges 32, 32' of the tension arms 31, 31'. In case the outer circumferential surface of the disc 11 is downwardly deflected due to the weight of the disc 11, the disc 11 may interfere with the lower flange 32 of the flanges 32, 32' guiding the disc 11 into the receiving groove 40.

In this case, the tension arm-disc holder 30 cannot be taken out due to interference between the casing 20, the disc 11 and the tension arms 31, 31'. Even if the tension arm-disc holder 30 is externally taken out, the disc recording side may be scratched or contaminated due to the interference between the flanges 32, 32' and the disc 11.

In addition, in a recording or reproducing mode, the disc 11 cannot be normally rotated due to the interference between the disc 11 and the flanges 32, 32', and thus it is impossible to perform a recording/reproducing operation. Moreover, the disc may be seriously damaged.

SUMMARY OF THE INVENTION

It is therefore an object of the present invention to provide a disc cartridge in which the height of support a rib is set to keep a disc at a proper position to prevent any interference between the disc when received in a casing and flanges of a tension arm-disc holder.

In order to achieve the above-described object of the present invention, there is provided a structure of a disc cartridge including a casing receiving a disc; and a disc holder disposed separably at a disc receiving slot of the casing, having tension arms elastically holding the disc, and guiding the disc into the casing or taking out the disc from the casing, wherein a height of a protruding member contacted with a non-recording region of the disc is set to have a predetermined height from an inner surface of the casing and is being equal to or greater than a sum of a deflection of the disc by gravity, a deflection of the tension arms, and an air gap which must be maintained between outer edges of the disc and the flanges of the tension arms.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A structure of a disc cartridge in accordance with a preferred embodiment of the present invention will now be described with reference to the accompanying drawings.

Figure 5:
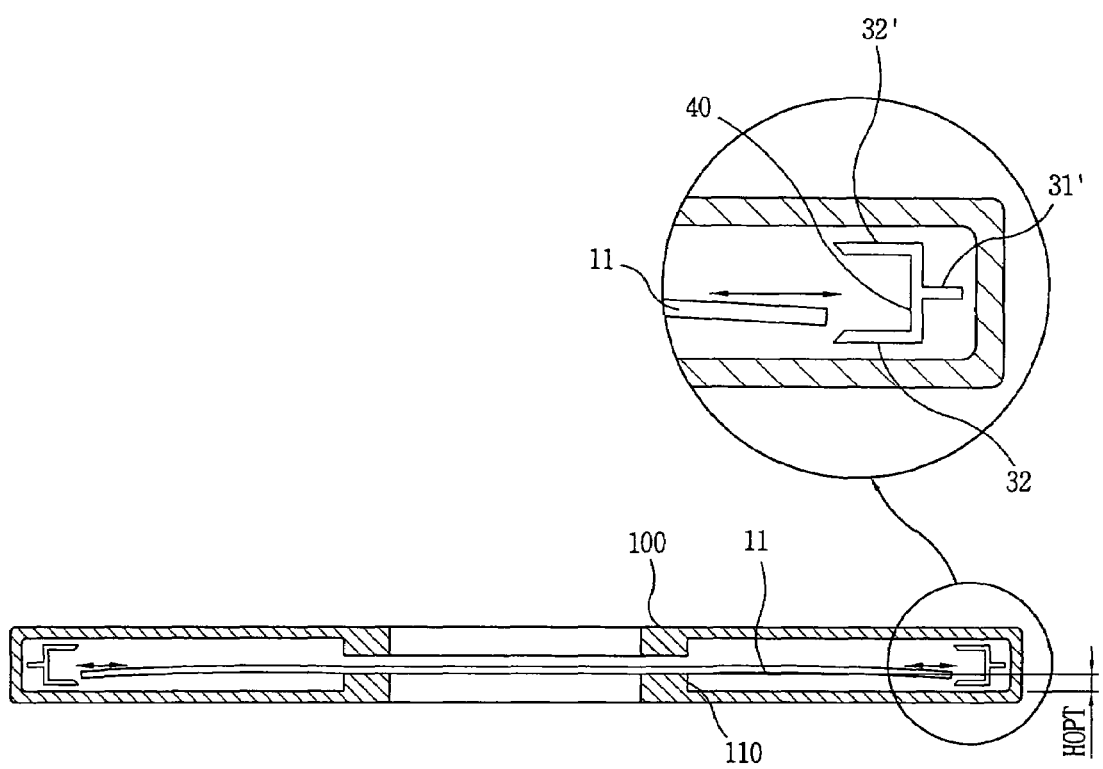
FIG. 5 is a cross-sectional view illustrating a relationship between a disc and tension arms of a tension arm disc holder in a disc cartridge in accordance with a preferred embodiment of the present invention.

FIG. 5 is a cross-sectional view illustrating the relationship between a disc and tension arms in the disc cartridge in accordance with the preferred embodiment of the present invention. Identical components to the prior proposed disc cartridge shown in FIGS. 1-4 are designated with the same reference numerals.

As shown therein, the structure of the disc cartridge in accordance with the preferred embodiment of the present invention includes: a casing 100 provided with a rib 110 having a certain height from an inner surface thereof in order to maintain a height of a disc 11 at a contacting position of the disc 11 with the tension arms 31, 31'; and a tension arm disc holder (not shown) holding the disc 11 and insertable through a receiving slot (not shown) formed in the casing 100, and guiding the disc 11 into or out of the casing 100.

The height of the rib 110 must be set by considering a deflection of the disc 11 due to gravity, a deflection of the tension arms 31, 31', and a minimal gap between the disc and the flanges 32, 32' for stable contact between the disc 11 and the tension arms 31, 31', so that an outer circumferential edge surface of the disc 11 can always face the receiving groove 40 between the flanges 32, 32'.

That is, in the disc cartridge receiving the disc having a predetermined diameter, when it is presumed that the vertical deflection of the disc 11 due to gravity is G, the vertical deflection of the tension arms 31, 31' is D, and the height of the minimal gap between the inner surfaces of the disc 11 and the flanges 32, 32' of the tension arms 31, 31' is A, the rib 110 has a height $H_{opt}$ equal to or greater than a value computed by the following expression.

$$H_{opt} = G + D + A$$

For example, in the disc cartridge receiving a disc having a diameter of 80 mm, when it is presumed that the vertical deflection of the disc 11 due to gravity is 0.2 mm, the vertical deflection of the tension arms 31, 31' is 0.05 mm, and the height of the minimal gap between the inner surfaces of the disc 11 and the flanges 32, 32' of the tension arms 31, 31' is 0.1+0.05 mm, the rib 110 should have height $H_{opt}$ equal to or greater than "0.2+0.05+0.05=0.3 mm".

Here, the height $H_{opt}$ of the ribs 110 is preferably 0.35 mm.

In a fabricating process of the disc cartridge according to the present invention, the height of the rib 110 is firstly set to be a minimal height enabling the disc 11 and the tension arms 31, 31' to make proper contact, by considering the above-described conditions. Thereafter, the thickness of the casing 100, namely the thickness between the outer surface and the inner surface of the casing 100 is set equal to or less than 2.2 mm.

The disc cartridge is formed in accordance with the height of the ribs 110 and the thickness of the casing 100.

Here, when the tension arm disc holder 30 is formed, the tension arms 31, 31' are formed in a single body, and have a predetermined elastic force. The tension arms 31, 31' hold the disc 11 and guide it into the casing 100. When the tension arm disc holder 30 is disposed in the casing 100, the tension arms 31, 31' are contacted by the guide ribs 21, 21' formed in the casing 100, and thus spread apart and separated from the disc 11.

Accordingly, the circumferential edge surface of the disc 11 maintains a predetermined gap predetermined from the inner surfaces of the flanges 32, 32' by the rib 110, thereby preventing an interference from occurring between the disc 11 and the flanges 32, 32'.

Figure 1:
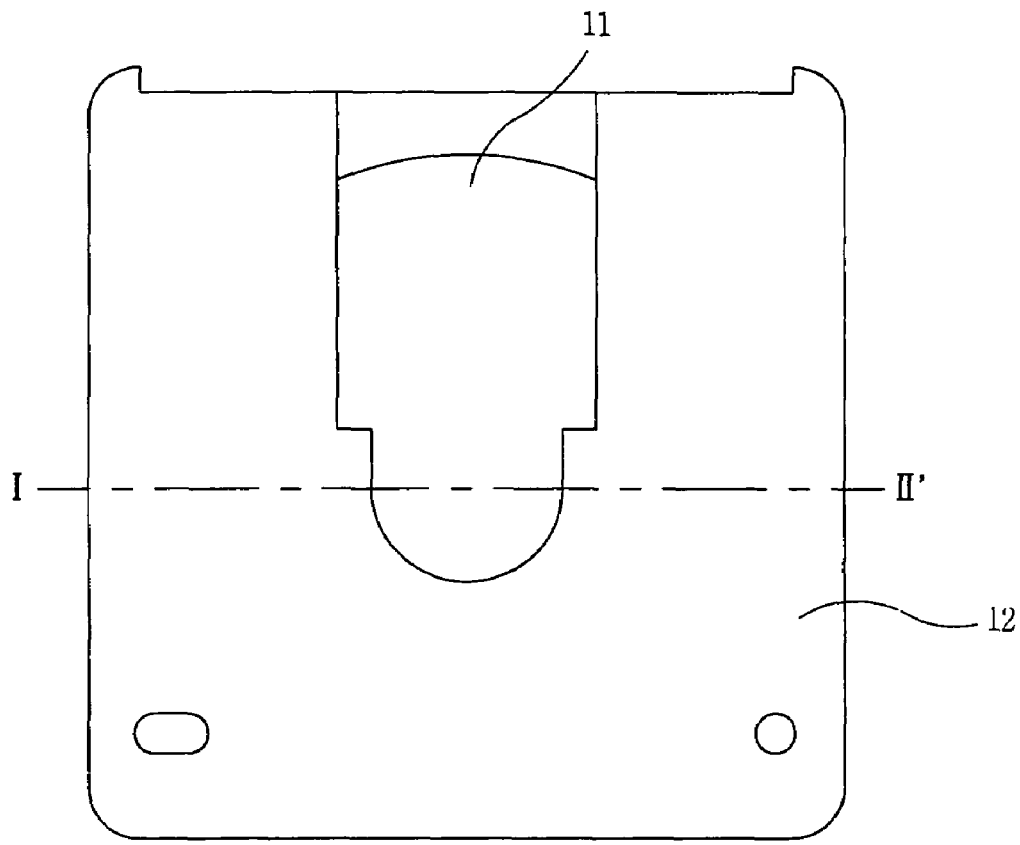
FIG. 1 is a plan view illustrating a general disc cartridge.
Figure 2:
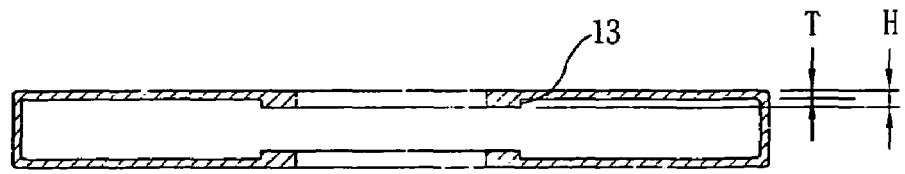
FIG. 2 is a cross-sectional view taken along line II-II' in FIG. 1.
Figure 3:
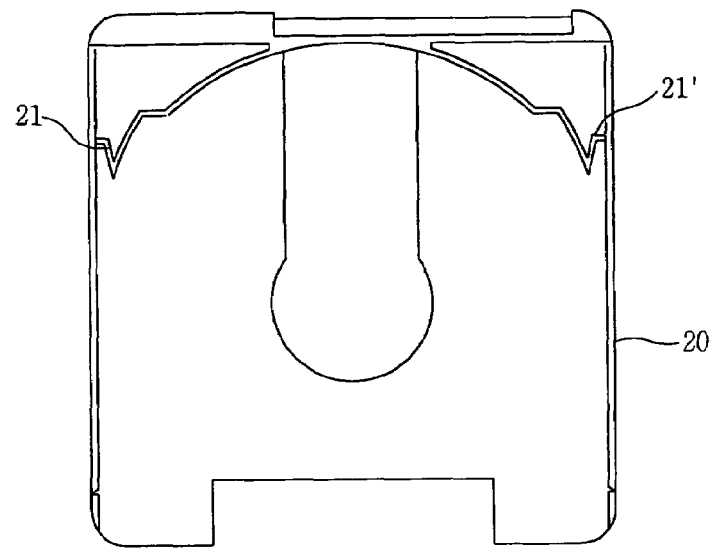
FIG. 3 is an exploded plan view illustrating an earlier proposed disc cartridge having a tension arm disc holder.
Figure 3:
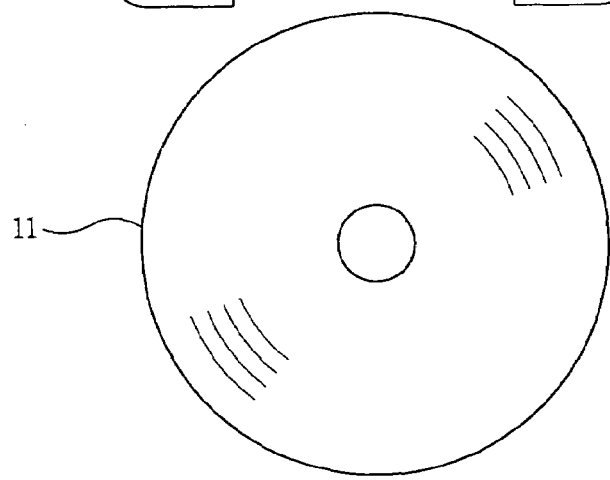
Figure 3:
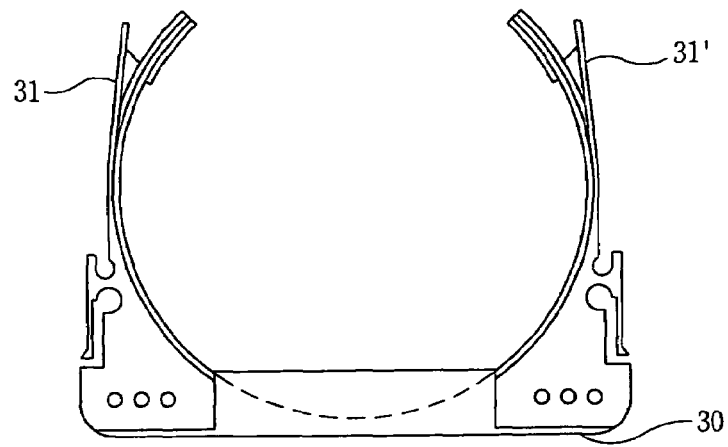
Figure 4:
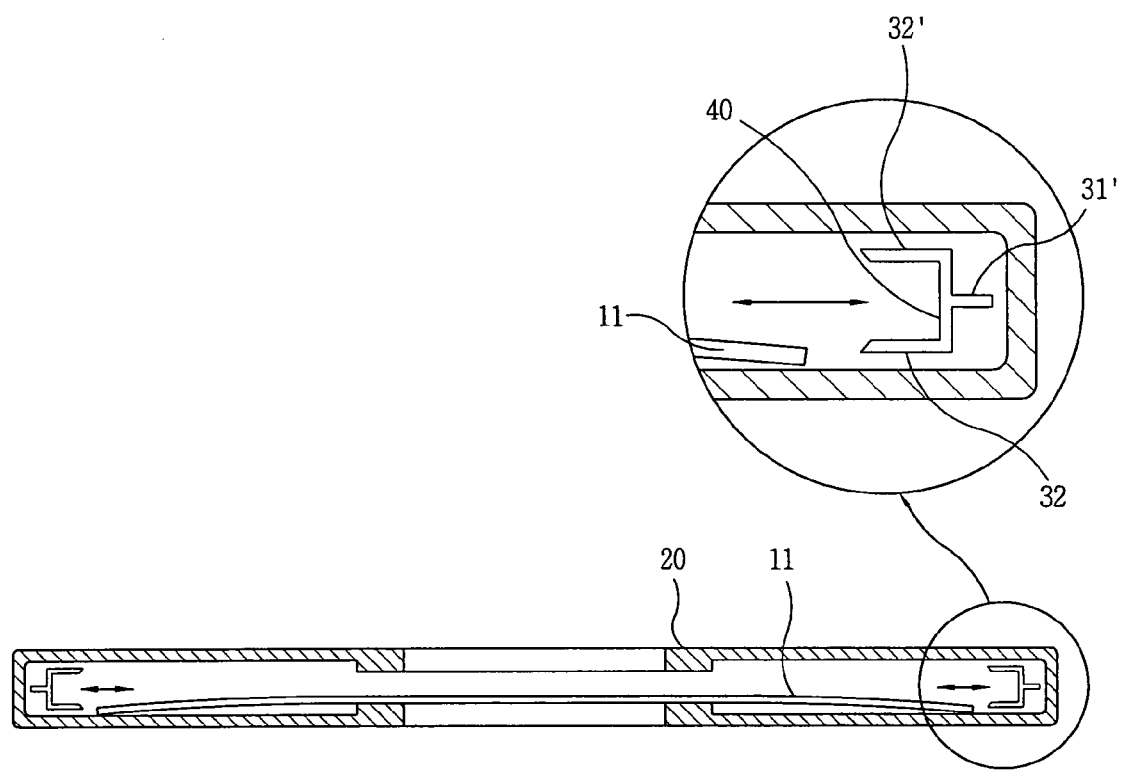
FIG. 4 is a cross-sectional view illustrating an interference between a disc and tension arms of the tension arm disc holder in earlier proposed disc cartridge.

On the other hand, in accordance with the present invention, when the ribs 110 are set to have a predetermined height, a gap between the disc 11 and the inner surface of the casing 100 is sufficiently maintained even in the hermetic disc cartridge which does not have the tension arm disc holder 30 as shown in FIG. 1.

In addition, as a diameter of the disc is increased, the vertical deflection due to gravity is also increased. In a disc cartridge receiving the disc having a greater diameter, a vertical gap between the disc and the inner surface of the casing is sufficiently maintained by restricting the height of the ribs 110.

As discussed earlier, the disc cartridge in accordance with the present invention restricts the height of the ribs receiving the non-recording side of the disc, thereby preventing an interference between the disc and the other components. As a result, the disc is not damaged, and the recording/reproducing operation is smoothly carried out.

As the present invention may be embodied in several forms without departing from the spirit or essential characteristics thereof, it should also be understood that the above-described embodiment is not limited by any of the details of the foregoing description, unless otherwise specified, but rather should be construed broadly with its spirit and scope as defined in the appended claims, and therefore all changes and modifications that fall within the metes and bounds of the claims, or equivalencies of such metes and bounds are therefore intended to be embraced by the appended claims.

What is claimed:

1. A disc cartridge comprising:

a casing for receiving a disc therein;

a disc holder separably disposable in the casing, having tension arms for elastically holding the disc, and guiding the disc into or out of the casing; and a protruding supporting member being provided within the casing and protruding to a predetermined height from an inner surface of the casing for contacting with and supporting a non-recording region of the disc, the height being equal to or greater than a value $H_{opt}=G+D+A$, wherein G is vertical deflection of the disc due to gravity, D is a vertical deflection of the tension arms, and A is a gap which must be minimally obtained between the disc and flanges of the tension arms wherein G is 0.2 mm, D is 0.05 mm, and A is 0.1+/−0.05 mm;

wherein the height of the protruding supporting member is sufficient to prevent any interference between the disc and tension arms.

2. The disc cartridge according to claim 1, wherein a height of the protruding supporting member is equal to or greater than 0.3 mm front the inner surface of the casing.

3. The disc cartridge according to claim 1, wherein a height of the protruding supporting member is 0.35 mm from the inner surface of the casing.

4. The disc cartridge according to claim 1, wherein an edge of said disc is carried by a flange of said tension arms while the disc is loaded onto the cartridge and after the disc is loaded onto the cartridge, interference is prevented between the disc and the tension arms.

5. The disc cartridge according to claim 1, wherein the tension arms have a cross- sectional shape with an upper flange and a lower flange parallel to each other and connected by a vertical portion perpendicular to the flanges being parallel to the main surface of said casing.

6. A disc cartridge comprising:

a disc holder disposed at a casing so as to he separable horn a disc; and a protruding supporting member formed within the casing to have a minimal height equal to or greater than a value $H_{opt}=G+D+A$, wherein G is a vertical deflection of the disc due to gravity, D is a vertical deflection of the tension arms, and A is gap which must be minimally obtained between the disc and flanges of the tension arms enabling the disc holder to be contacted with the disc in the casing wherein G is 0.2 mm. D is 0.05 mm, and A is 0.1+/−0.05 mm;

wherein the height of the protruding supporting member is sufficient to prevent any interference between the disc and the disc holder.

7. The disc cartridge according to claim 6, wherein an edge of said disc is carried by a flange of said tension arms while the disc is loaded onto the cartridge and after the disc is loaded onto the cartridge, interference is prevented between the disc and the tension arms.

8. The disc cartridge according to claim 6, wherein the tension arms have a cross- sectional shape with an upper flange and a lower flange parallel to each other and connected by a vertical portion perpendicular to the flanges being parallel to the main surface of said casing.

* * * * *